May 5, 1970     G. R. SOPCHACK     3,510,642
BAIT GATHERING IMPLEMENT

Filed Aug. 8, 1967     2 Sheets-Sheet 1

INVENTOR.
GEORGE R. SOPCHACK
By Parmelee, Utzler & Welsh
Attorneys

May 5, 1970  G. R. SOPCHACK  3,510,642
BAIT GATHERING IMPLEMENT
Filed Aug. 8, 1967  2 Sheets-Sheet 2
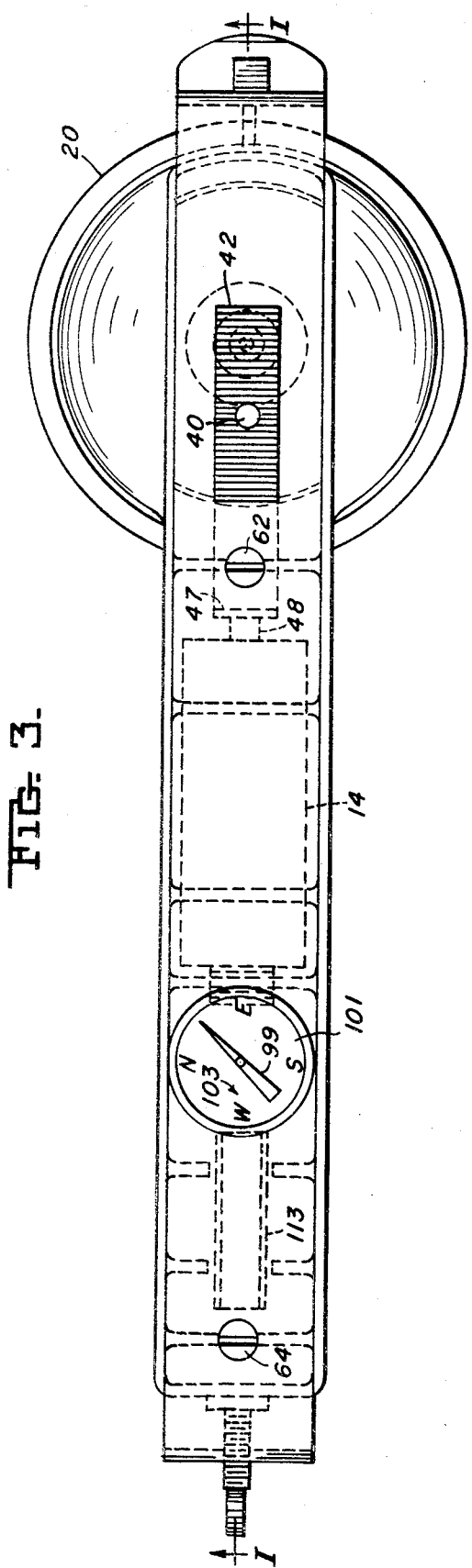
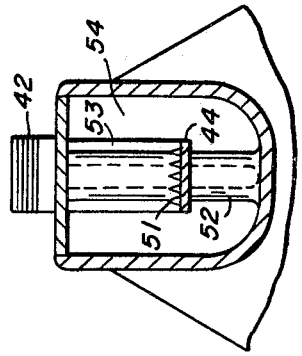
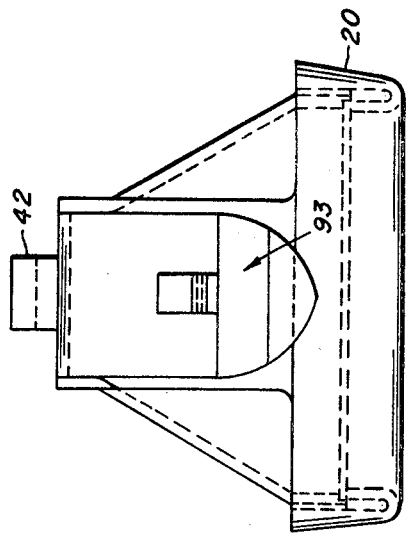
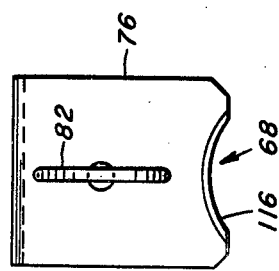
INVENTOR
GEORGE R. SOPCHACK
By
Parmelee, Utzler & Welsh
Attorneys

United States Patent Office

3,510,642
Patented May 5, 1970

---

3,510,642
BAIT GATHERING IMPLEMENT
George R. Sopchack, 1322 Victoria Ave.,
New Kensington, Pa. 15068
Filed Aug. 8, 1967, Ser. No. 659,211
Int. Cl. F21v 33/00
U.S. Cl. 240—6.4                                    8 Claims

ABSTRACT OF THE DISCLOSURE

A bait gathering implement which includes a carrier constructed and arranged to be gripped in one's hand and carried in a horizontal position. The carrier includes an illuminating device at one end thereof to direct light downwardly into the area where bait is being collected and a container for storing collected bait, and being located at the other end of the carrier which is maintained by the carrier in an upright position when the illuminating device is directed downwardly. The carrier consists of a hollow elongated body, which body forms the battery casing for the illuminating device, having a bottom portion with an end wall, and a top plate which is removably secured to the bottom portion to provide access to the interior of the elongated body. The top portion of the elongated body has a downwardly turned extension at the end where the container is located with a clamping screw thereon for releasably securing the container against the end wall of the body.

---

This invention relates in general to bait gathering implements and more particularly, to a bait gathering implement including an illuminating means.

It is the usual practice of fishermen in search of bait, such as night crawlers, to walk over a lawn, golf course or similar grassy expanse with a flashlight in one hand and with a can, bucket or some other type of container in the other. The purpose of the flashlight being to illuminate and aid in the finding of the night crawlers and the purpose of the container being to store the night crawlers when found.

The fisherman when locating a night crawler must of course place the container on the ground in order to free one hand so that the night crawler can be picked up and put into the container. This procedure must be followed each time a night crawler is found and it is quite evident that the same is tiresome, burdensome and time consuming.

With the use of the present invention this procedure is no longer required, as the bait gathering implement is designed to be carried in one hand of the user thereby allowing the other hand of the user to be free at all times. Further, as a result of use of the present invention, the gathering of bait is greatly facilitated and progresses more rapidly thereby saving time and effort on the part of the user.

Briefly, the present invention provides a bait gathering implement comprising a carrier constructed and arranged to be gripped in one's hand and carried in a horizontal position. An illuminating means is positioned on the carrier to direct light downwardly into the area where bait is being collected when the carrier is held in the horizontal position. A container is positioned on the carrier removed from the illuminating means and the field of light projected thereby and which is maintained by the carrier in an upright position at all times when the illuminating means is directed downwardly.

Accordingly, it is a primary object of the present invention to provide a bait gathering implement which will permit the user to always have one hand free thereby allowing the user to save time and effort in gathering bait.

The invention will be fully and comprehensively understood with other projects and advantages which will become subsequently apparent as the details of construction and operation are more fully hereinafter described and claimed, reference being had to the accompanying drawings forming a part thereof, wherein like numerals refer to like parts throughout, and in which:

FIG. 3 is a plan view of the bait gathering implement according to the invention;

FIG. 4 is a view taken on line IV—IV of FIG. 2;

FIG. 5 is a side view of the bait gathering implement according to the invention; and FIG. 6 is a view taken on line VI—VI of FIG. 1.

Figure 1:
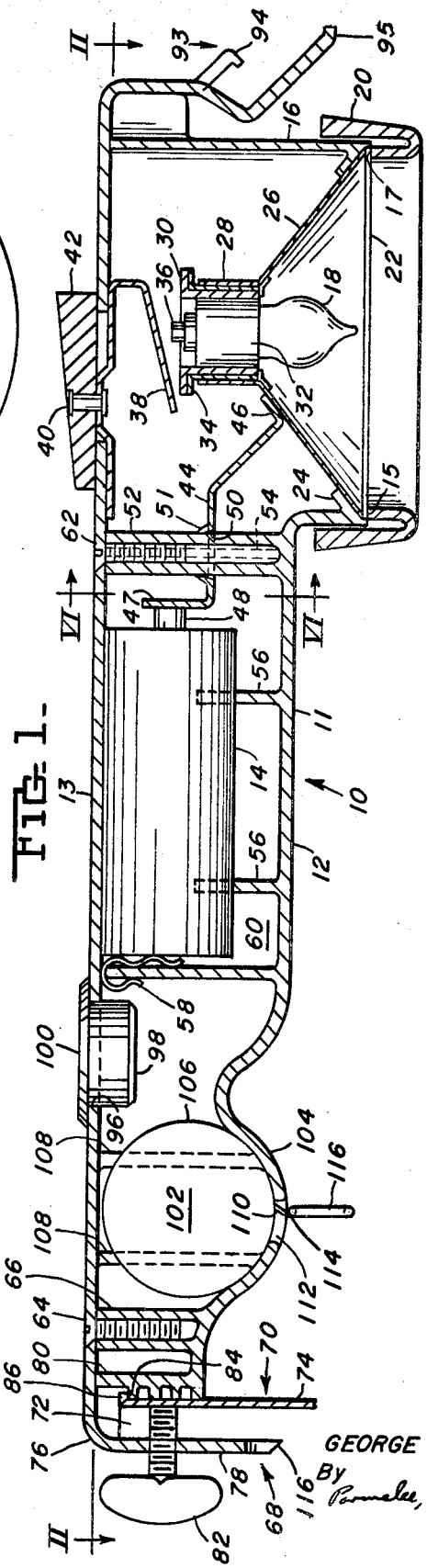
FIG. 1 is a view in longitudinal section of the bail gathering implement of the invention taken substantially on line I—I of FIG. 3.
Figure 2:
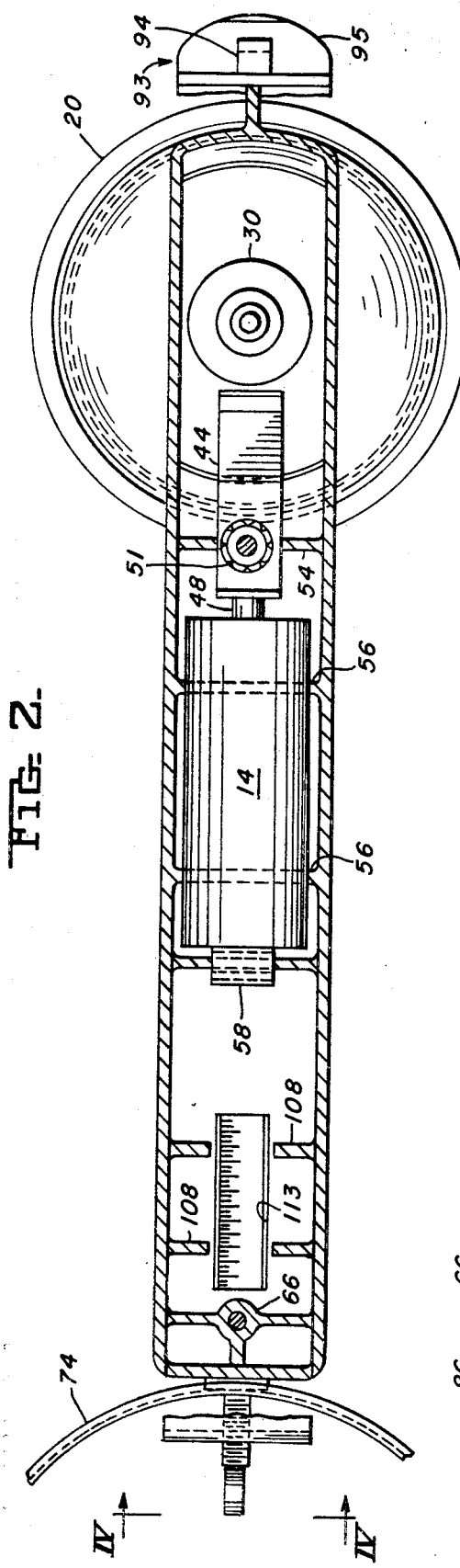
FIG. 2 is a cross sectional plan view taken on line II—II of FIG. 1.

Referring now by reference numerals to the drawing which represents a practical embodiment of the present invention, 10 designates a bait gathering implement comprising a carrier or hollow elongated body 11 having a bottom portion 12 and an access or top plate 13. The body 11 serves as a handle constructed and arranged to be gripped in one's hand as well as a container for a source of electrical energy here shown as a battery 14. While only one battery 14 is shown it is to be understood that a group of two or more cells may be provided in the body 11. Integral with one end of the bottom portion 12 is a head portion 16 the vertical axis of which is at right angles to the longitudinal axis of the body 11 and which has mounted therein a source of illumination or light bulb 18. Head 16 receives thereon a removable closing cap 20 which may be held on head 16 by friction fit or may be threaded thereon in a well-known manner. Interposed between a seat 15 at the lower end of head 16 and an upturned flange 17 on cap 20 is a coverglass 22 of light transmitting material to allow rays of light to pass therethrough. Mounted within the head 16 and held in position on an inwardly directed seat 24 by cap 20 is a reflector shell 26 constructed of any suitable conductive material. Reflector shell 26 includes a neck portion 28 which has mounted therein a socket 30 constructed of suitable insulating material. The socket 30 is for reception of the bulb base 32 of the light bulb 18. Encircling the socket 30 is a sleeve 34 of suitable conductive material. The bulb base 32 electrically engages the reflector 26 through sleeve 34. The center contact 36 of bulb base 32 is engageable by the contact 38 mounted at 40 to slidable thumb switch 42 carried on removable top plate 13. Mounted within the body 11 and extending into the head 16 is a conductor plate 44 of any suitable conductive material having one end 46 electrically connected to sleeve 30 through reflector 26 and its opposite end 47 being electrically connected to the center electrode 48 of battery 14. The conductor plate 44 has an opening 50 therethrough with serrations 51 which permit the plate 44 to frictionally engage upright post 52 extending upwardly within bottom portion 12. A clearance space 53 is provided in transverse rib 54 to accommodate plate 44.

The battery 14 is mounted longitudinally in a cavity in the bottom portion 12 and is seated on transverse ribs 56 extending upwardly from the bottom portion 12 and a generally U-shaped spring clip 58 is positioned over the top of transverse cross rib 60 and yieldingly urges the battery 14 forwardly to be electrically connected to the end 47 of conductor plate 44. Spring clip 58 also electrically connects the battery casing or its outer electrode through top plate 13 to contact 38.

The top plate 13 is removably secured to the lower portion 12 to permit access to the interior of the body 11 by screw 62 which screws into post 52 and by screw 64 which screws into another post 66 on the end of the body 11 opposite to that carrying the light bulb 18. Top plate 13 may be constructed of any suitable conductive material, as for instance steel or aluminum, while bottom portion 12 may be constructed of any suitable insulating material, as for example plastic or rubber. Preferably, the entire bottom portion 12 is made as one piece with the various transverse portions being integrally formed therewith. The top plate 13 is also desirably formed as one piece.

A bracket shown generally at 68 is carried by the end of the body 11 opposite to that carrying the light bulb for releasably clamping the lip of a partially shown container 70 having an open top 72, a closed bottom (not shown) and a sidewall 74 against the body 11. The bracket comprises a flange or extension portion 76 integral with the top plate 13. The extension portion 76 includes a portion 78 spaced from and generally parallel to the terminal portion or end wall 80 of the lower portion 12 and extends downwardly at substantially right angles to the longitudinal axis of the body 11 such that the sidewall 74 of the container 70 may be positioned between the extension portion 76 and the end wall 80 of the body 11.

A clamping scew 82 is threaded in and extends through the extension portion 76 and is movable toward and away from end wall 80 for releasably securing the sidewall 74 of the container 70 against the end wall 80 of the body 11. The end wall 80 includes a shoulder portion 84 which extends parallel to the longitudinal axis of the body 11. A lip portion or bead 86 which extends around the open top 72 of the container 70 overlaps the shoulder portion 84 when the sidewall 74 of the container 70 is secured against the end wall 80.

In order to aid in various activities as engaged by potential users of the bait gathering implement of the present invention other accepted pieces of equipment which have heretofore been regarded as individual articles are incorporated into the bait gathering implement 10.

The top plate 13 includes a forwardly and downwardly directed projection 93 providing protection to the illuminating means carried within head 16 and protection to the head 16 against endwise contact with an object when the bait gathering implement 10 is stored or used in an enviroment where contact with foreign objects is likely. Also, the projection 93 includes portions 94 and 95 which together comprise a bottle opener.

The top plate 13 is also provided with an opening 96 which is dimensioned or sized for snugly receiving the body portion 98 of a compass 100. The body portion 98 is rigidly maintained in the opening 96 by any effective means such as by friction fit or if desired threads may be provided on body portion 98 of the compass and in the opening 96 in a well-known manner.

The compass 100 has mounted therein the usual magnetic needle 99 with covering crystal 101 which is provided with legends 103 for coaction with needle 99 in a well-known manner.

A measuring device such as a tape measure shown at 102 is also provided in the body 11. The lower portion 12 of the body 11 includes an arcuate shaped portion 104 to receive the circular casing 106 of the tape measure 102. The tape measure 102 is held in an operative upright position within the body 11 by oppositely disposed ribs 108. A calibrated tape 110 extends through a slot or opening 112 in the arcuate portion 104 and terminates in an end 114 which has a stop 116 on the end thereof to prevent the tape 110 from being drawn through the slot 112.

Viewing of the tape 110 may be had through longitudinal slit 113 provided in top plate 13.

To provide another aid to the potential user of the flashlight 10, the lower end of extension portion 76 terminates in a knife edge 116 (FIG. 4) which may for example be utilized in the cutting of fishing line. The knife edge 116 is normally shielded from accidental contact by the container when the container is clamped in place.

From the foregoing it can be seen that the embodiment described provides a bait gathering implement designed to be carried in one hand of the user and allows the other hand of the user to be free at all times, and which is further designed to provide both the illumination needed in locating bait and the container for storing the bait.

While I have herein described and shown an illustrative embodiment of the invention, it is to be understood that the invention is not limited thereto, but may comprehend other constructions, arrangement of parts, details and features without departing from the spirit of the invention.

I claim:

1. A bait gathering implement comprising
   a carrier constructed and arranged to be gripped in one's hand and carried in a horizontal position,
   an electric illuminating means on the carrier positioned to direct light downwardly into the area where bait is being collected when the carrier is held in the horizontal position, and
   an open top container positioned on the carrier removed from the illuminating means and the field of light projected thereby and which is maintained by the carrier in an upright position at all times when the illuminating means is directed downwardly.

2. The bait gathering implement according to claim 1 wherein the carrier comprises a hollow elongated body with the illuminating means being located at one end thereof and the container being located at the other end thereof.

3. A bait gathering implement according to claim 2 wherein the hollow elongated body includes an end wall at the end where the container is located, a portion of the hollow elongated body at the end where the container is located projecting beyond the end wall and having a downwardly turned extension spaced from the end wall, a clamping screw mounted on the extension for movement toward and away from the end wall, the container having a lip portion that is releasably clamped between the screw and the end wall.

4. A bait gathering implement according to claim 2 wherein the hollow elongated body comprises a bottom portion having an end wall and a top plate, the top plate at the end where the container is located having a downwardly turned extension spaced from the end wall, a clamping screw threaded in and extending through the extension for releasably securing the container against the end wall.

5. A bait gathering implement according to claim 3 wherein the downwardly turned extension terminates in a knife edge that is normally shielded from accidental contact by the container when the container is clamped between the screw and the end wall.

6. A bait gathering implement according to claim 5 wherein the top plate at the end of the hollow elongated body where the illuminating means is located includes a forwardly and downwardly directed projection providing protection to the illuminating means against endwise contact with an object when the implement is stored or used in an environment where contact with foreign objects is likely.

7. A bait gathering implement according to claim 2 wherein the hollow elongated body provides a cavity for a battery, the illuminating means being an electric lamp.

8. A bait gathering implement according to claim 7 wherein the hollow elongated body comprises a bottom portion and a top plate, the top plate being removably secured to the bottom portion to provide access into the interior of the hollow elongated body.

References Cited

UNITED STATES PATENTS

| | | | |
|---|---|---|---|
| 1,890,841 | 12/1932 | Brown | 240—6.46 |
| 2,524,173 | 10/1950 | Peterson | 240—52.5 |
| 2,599,254 | 6/1952 | Gits et al. | 240—10.67 |
| 2,645,706 | 7/1953 | Bowland | 240—10.65 |
| 2,779,865 | 1/1957 | Hermeyer et al. | 240—52.5 X |
| 2,804,538 | 8/1957 | Leone | 240—6.4 |
| 2,810,821 | 10/1957 | Cohn | 240—6.4 |

NORTON ANSHER, Primary Examiner

F. L. BRAUN, Assistant Examiner

U.S. Cl. X.R.

240—10.67, 52.5